(12) United States Patent
Zaanen et al.

(10) Patent No.: US 8,790,446 B2
(45) Date of Patent: Jul. 29, 2014

(54) REMOVAL DEVICE FOR MICRO-BUBBLES AND DIRT

(75) Inventors: Abraham Zaanen, Lekkerkerk (NL); Jan Henk Cnossen, Koudum (NL)

(73) Assignee: Flamco B.V., Buschoten (NL)

( * ) Notice: Subject to any disclaimer, the term of this patent is extended or adjusted under 35 U.S.C. 154(b) by 317 days.

(21) Appl. No.: 13/496,299

(22) PCT Filed: Sep. 27, 2010

(86) PCT No.: PCT/NL2010/050626
§ 371 (c)(1),
(2), (4) Date: Mar. 15, 2012

(87) PCT Pub. No.: WO2011/037465
PCT Pub. Date: Mar. 31, 2011

(65) Prior Publication Data
US 2012/0175318 A1 Jul. 12, 2012

(30) Foreign Application Priority Data
Sep. 25, 2009 (NL) ...................................... 2003551

(51) Int. Cl.
| B01D 19/00 | (2006.01) |
| B01D 43/00 | (2006.01) |
| B01D 21/24 | (2006.01) |
| B01D 21/00 | (2006.01) |
| E03B 7/09 | (2006.01) |

(52) U.S. Cl.
CPC .............. *E03B 7/09* (2013.01); *B01D 21/2494* (2013.01); *B01D 21/0063* (2013.01); *B01D 21/0045* (2013.01); *B01D 2221/02* (2013.01); *B01D 21/0069* (2013.01); *B01D 21/2405* (2013.01)
USPC ................... 95/262; 96/220; 96/207; 96/215; 210/790; 210/532.1

(58) Field of Classification Search
CPC ........... B01D 19/0042; B01D 21/0045; B01D 21/2494; B01D 2221/02; B01D 21/0063
USPC ............... 95/262; 96/220, 207, 215; 210/790, 210/532.1
See application file for complete search history.

(56) References Cited

U.S. PATENT DOCUMENTS

| 4,096,063 A | 6/1978 | Hashimoto et al. |
| 4,895,652 A | 1/1990 | Cornelissen |

(Continued)

FOREIGN PATENT DOCUMENTS

| CA | 2292154 A1 | 12/1999 |
| DE | 1142798 B | 1/1963 |

(Continued)

OTHER PUBLICATIONS

English Machine Translation of DE1142798. English Machine Translation of DE 401229.

(Continued)

*Primary Examiner* — Duane Smith
*Assistant Examiner* — Douglas Theisen
(74) *Attorney, Agent, or Firm* — Hoffmann & Baron, LLP

(57) ABSTRACT

A removal device for removing gas bubbles and/or dirt particles from a liquid in a conduit system includes a housing (12) with an entry (14) and an exit (16) and a inter space (18) which is defined by the housing (12), wherein in the inter space a number of plates (20) are provided which extend substantially transversally to a main flow direction (58), wherein the plates (20) define a main ongoing flow channel (22), and wherein the plate define branch flow channels (21) which end in at least one quiet zone (44;48), and wherein at least one plate (50) defines a merge flow channel for a merge flow which merges with the main flow (22) at a merge point which is located downstream.

11 Claims, 5 Drawing Sheets

(56) References Cited

U.S. PATENT DOCUMENTS

| | | | |
|---|---|---|---|
| 6,062,767 A * | 5/2000 | Kizhnerman et al. | 405/39 |
| 8,070,141 B2 * | 12/2011 | Kooijman et al. | 261/108 |
| 2005/0218070 A1 | 10/2005 | Seregin et al. | |
| 2009/0078118 A1 * | 3/2009 | Kooijman | 96/207 |
| 2011/0000862 A1 | 1/2011 | Semba et al. | |
| 2012/0097039 A1 * | 4/2012 | Vandenbulcke | 96/220 |

FOREIGN PATENT DOCUMENTS

| | | |
|---|---|---|
| DE | 4017229 A1 | 12/1990 |
| EP | 0244881 A1 | 11/1987 |
| WO | 2009104572 A1 | 8/2009 |

OTHER PUBLICATIONS

English Machine Translation of WO 2009/104572 A1.

\* cited by examiner

REMOVAL DEVICE FOR MICRO-BUBBLES AND DIRT

CROSS-REFERENCE TO RELATED APPLICATIONS

This application is the National Stage of International Application No. PCT/NL2010/050626, filed Sep. 27, 2010, which claims the benefit of Netherlands Application No. 2003551, filed Sep. 25, 2009, the contents of which is incorporated by reference herein.

FIELD OF THE INVENTION

The present invention relates to a removal device for micro-bubbles and dirt from a liquid in a conduit system. Removal devices are known.

PRIOR ART

In the prior art, various removal devices have been developed. EP0244881A1 discloses a removal device with flow channels 3 which are inclined, see FIG. 1 of EP0244881A1. The flow channels 3 are defined by longitudinal baffles 2 which are inclined. At the upper end and lower end of the flow channels 3, lateral baffles 11, 12 are provided which define quiet zones 8.

It was found that the flow in the removal device according to EP0244881A1 has a disadvantageous form.

U.S. Pat. No. 4,096,063 discloses a removal device with a flow channel with lateral baffles 3 which define quiet zones 5. As can be seen in FIG. 8 of U.S. Pat. No. 4,096,063, in use, eddies are created in the quiet zones 5 in which dirt can settle down.

The cross-section of the flow channels in U.S. Pat. No. 4,096,063 (when seen in the direction of flow) is elongate. The flow channels extend vertically when seen in cross-section, see FIG. 1 of U.S. Pat. No. 4,096,063. The quiet zones 5 are located on the left side and on the right side of the flow channels. It was found that the form of the flow channels is disadvantageous for the functioning of the removal device.

U.S. Pat. No. 4,895,652 also discloses a removal device with lateral baffles. The flow channels are (in cross section) rectangular and are provided at an angle α with the horizontal, see column 3, line 61 of U.S. Pat. No. 4,895,652. Lateral baffles 11 form quiet zones in the form of gutters 4, 5 which extend transverse to the direction of flow. In use, dirt particles collect in the lower gutters 4 and, due to the angle α at which the gutters 4, 5 extend, slide in a downwards direction. Gas particles collect in the gutters above and slide upwards due to the angle α of the gutters 4,5. One or more collection chambers are provided, see column 3, lines 7-8: "collecting chamber". A removal device according to U.S. Pat. No. 4,895,652 is also called a "cross-flow separator", i.e. a removal device with a cross-flow.

The device to U.S. Pat. No. 4,895,652 was found to have only a moderate performance in practice.

OBJECT OF THE INVENTION

It is an object of the invention to provide an improved removal device for micro-bubbles and/or dirt particles.

SUMMARY OF THE INVENTION

During research, it was found that the removal devices which are mentioned above have various disadvantages. The efficiency of removal of dirt and gas particles is lower than desired. Moreover, the resistance to flow is higher than desired. The velocity with which the liquid flows through the removal devices, is relatively high.

In the present invention, a reduction of the velocity has been achieved in another way.

The invention provides a removal device for removing gas bubbles and/or dirt particles from a liquid in a liquid conduit system, the removal device comprising a housing having an entry and an exit and an inner space which is defined by the housing, wherein in the inner space a number of plates are provided which extend substantially transverse to a main flow direction, wherein the plates define a main ongoing flow channel which extends between the entry and the exit, and wherein the plates define branch flow channels which branch off from the main channel, and which end in at least one quiet zone, and wherein at least one plate defines a return flow channel for a return flow which merges with the main flow at a downstream merge point.

Upon entry in the housing of the removal device, the main liquid flow is divided stepwise and is spread over a much larger surface area in the housing. This occurs in a forced way. The main flow can be divided directly after entry in the housing.

As a result of this, the velocity of the flow is reduced. The velocity of the liquid is reduced proportionally with the increase of the cross-sectional surface area.

In an embodiment, the removal device has a circular housing with a certain diameter, when seen from above.

A large exchange area is thereby created for the removal of micro-bubbles and dirt particles.

The main liquid flow is forced into a different form (i.e. flattened) by plates which are laterally placed with respect to the liquid flow in the housing of the removal device. The plates define interspaces between the plates.

With these plates, it is prevented that non-desired eddies are created in the quiet zones by the main liquid flow in a lower and upper region of the housing of the removal device.

A small portion of the main liquid flow is diverted through the quiet zones, between the laterally placed plates. In this way, it is achieved that the surface area of the flow is substantially increased, and that the velocity is substantially decreased.

In a different way than known from the mentioned prior art, multiple partial flows merge in the quiet zones.

In an embodiment of the invention, the controlled partial liquid flow has a forced trajectory. The trajectory is created by an endplate which is provided in front of the discharge opening in the housing of the removal device, which endplate has a constricted opening with respect to the main flow channel. Between this endplate and the housing of the removal device, a space is provided which is in liquid communication with the quiet zones via openings at the upper end and lower end of the space. The constricted opening in the endplate provides a limited drop of pressure in the main liquid flow during passage of the main liquid flow through the opening.

In use, the difference in pressure upstream and downstream of the endplate causes the diversion of the partial liquid flows (or branch flows) from the main flow in an upward and downward direction.

By providing the required dimensions to the constricted opening, the velocity of the partial liquid flows can be limited, in such a way that micro-bubbles and dirt particles are not carried with the flow.

In an embodiment, the plates which are oriented laterally to the main flow channel are provided with a curved edge, i.e. a baffle, with which the branch flow is curved into the branch flow channels. The necessity of providing a baffle for the liquid flow, and the degree of curvature of the baffle which is provided, is influenced by the velocity of the liquid, the constricted opening in the endplate and the viscosity of the liquid.

In a further embodiment, a curvature in the edges of the plates near the quiet zone in the direction of the liquid flow is provided, in such a way that the liquid is guided gradually and in a curved manner into the quiet zones and has less resistance.

The constricted opening can also be provided with a curvature in the direction of the liquid flow, which causes a better guiding of the liquid and a reduction of the resistance. Downstream of the constricted opening, the flow channel widens. In an embodiment, the widening of a flow channel is gradual, which reduces the loss of pressure.

In a further embodiment, the ends of the (guided) baffles are entirely or in part provided with a jagged or profiled rim, or with an irregular surface, with which a controlled torrent in the liquid is stimulated in order to prevent undesired vibrations at critical liquid velocities. In this way noise or possible damage to the installation is avoided.

The removal device can be provided in three variants:
1. a combined micro-bubbles and dirt removal device, i.e. as disclosed above.
2. a removal device for micro-bubbles, wherein only the upper part is provided in the housing according to the description above. The lower part of the removal device is not critical, as long as the forced division of the liquid flow according to the disclosed principle is maintained.
3. a dirt removal device, wherein only the lower part in the housing is provided according to the description above. The upper part of the removal device is not critical in this embodiment, as long as the forced division of the main liquid flow according to the disclosed principle is maintained.

In an embodiment, the lateral plates form a row of lateral plates which are placed one after the other when viewed in the direction of the flow. This is a very efficient configuration which leads to a high removal efficiency.

In an embodiment, the lateral plates form an upper row and a lower row.

The invention further relates to the manufacturing of a removal device according to the present invention, comprising providing a housing with an entry and an exit, placing plate in the housing according the configuration of the present invention.

The invention further relates to a method for removing dirt and/or gas particles from a conduit system, a method comprising placing a removal device according to the present invention in a conduit and causing a flow of liquid through the removal device, wherein gas particles and/or dirt particles are removed.

Herein below, the invention is elucidated with reference to a non-limiting drawing.

LIST OF FIGURES

Figure 5:
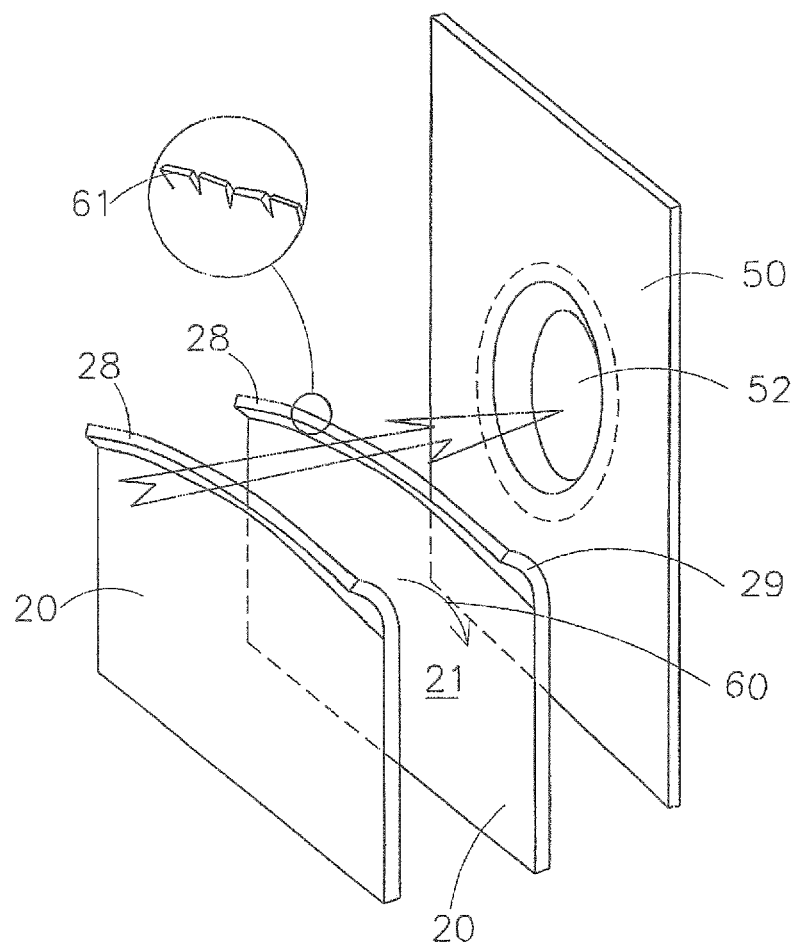

FIG. 5 schematically shows an embodiment with baffles.

Like reference numerals denote like parts.

DETAILED DESCRIPTION OF THE INVENTION

Figure 1:
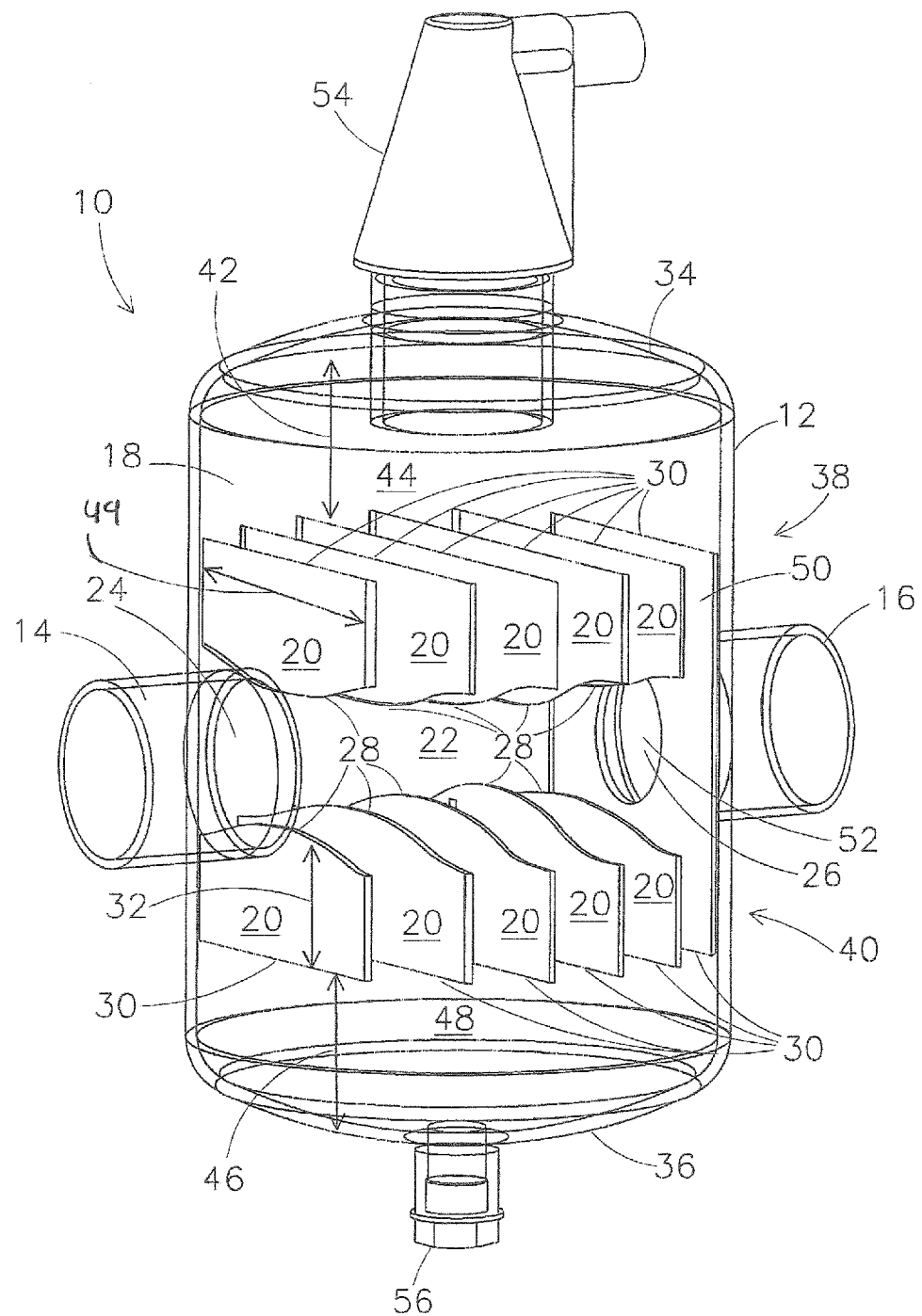
FIG. 1 shows a view of the removal device according to the invention.

FIG. 1 shows a removal device 10 with a housing 12 an entry 14 and an exit 16. The entry and the exit are configured to be connected to a conduit system, in such a way that the removal device is provided in-line with the conduit system. A typical conduit system for example is a warm water conduit system of a heating installation.

The housing 12 defines an inner space 18 with a certain volume. A number of plates 20 are provided in the housing 12. The plates 20 extend substantially laterally to the direction of flow. In a different embodiment, the plates can also be provided at a slight angle to a transverse direction of flow. The plates 20 define spaces 21 between them.

The plates 20 define a main flow channel 22. The plates 20 can be divided in two groups. A first group 38 of plates is provided above the main flow channel 22 and a second group 40 of plates is provided below the flow channel 22. The main flow channel 22 extends in a straight line from the entry opening 24 in the housing 12 to a discharge opening 26 in the housing. The groups 38, 40 form rows.

The total surface area of the flow in the interspaces 21 plus the surface area of the main flow channel 22 is substantially larger than the surface area of the entry opening 24 and the discharge opening 26. The surface area of the main flow channel 22 alone is also greater than the surface area of the entry opening and discharge opening.

The plates 20 extend transverse to the flow from a wall 12 on the left side of the housing, when seen in the direction of flow, to a wall 12 on the right side of the housing.

The plates 20 have a varying width 49 due to the—in top view—circular form of the housing 12. In another form of the housing it is also possible that the plates 20 have a uniform width.

The plates 20 have an edge 28 on the side of the flow channel 22. The edges 28 define entrances to the branch flow channels 21.

Figure 4A:
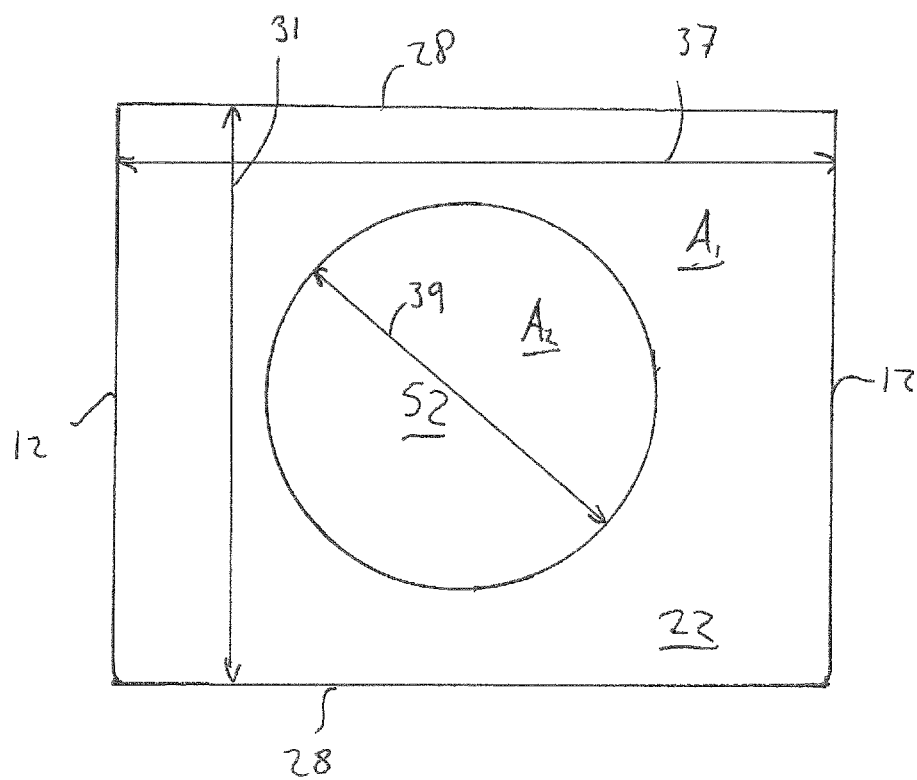
FIG. 4A shows a schematic cross-section of the flow channel, taken in the middle of the housing according to the line A-A in FIG. 2.

In FIG. 4A, the form of the main flow channel 22 is shown, which is substantially rectangular. The main flow channel 22 is delimited on the left and right side by the housing 12 of the removal device 10. The housing 12 extends substantially vertically at this location. On the bottom side, the flow channel 22 is delimited by the ridges 28 of the lower plates 20. The ridges 28 of the lower plates also form a substantially straight line and extend substantially horizontally. On the upper side, the flow channel 22 is delimited by the ridges 28 of the upper plates 20. The ridges 28 of the upper plates also form a substantially straight line and extend horizontally. The flow channel has a substantially uniform width 37 and a substantially uniform height 31. The flow channel 22 has a surface area A2. The flow channel 22 may also have a square form. The constricted opening 52 is substantially circular and has a diameter 39. The diameter 39 results in a surface area A2 of the opening 52 which is substantially smaller than the surface area A1 of the flow channel 22.

Figure 4B:
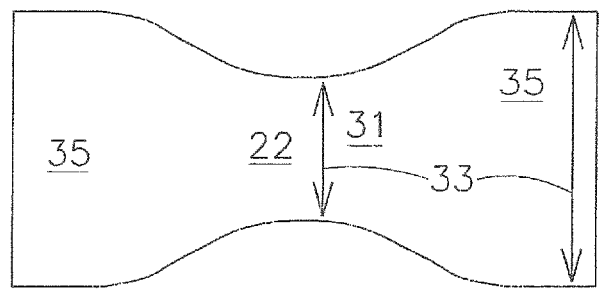
FIG. 4B shows a schematic cross-section of another embodiment of the flow channel, taken in the middle of the housing according to the line A-A in FIG. 2.

In FIG. 4B, an alternative embodiment is shown. The edge 28 has a curved form. The plates 20 have a varying height 32. When the flow channel 22 is seen in cross-section, the flow channel 22 has the form of an hourglass, wherein the hourglass extends horizontally. In the middle 31 the flow channel has a reduced height 33 in comparison with the heights on the height on the sides 35 of the flow channel 22.

The plates 20 have an edge 30 which is remote from the flow channel. The edges 30 define exits of the branch flow channels 21. The housing 12 has an upper side 34 and a lower side 36. The upper group 38 of plates has an upper edge 30 which is provided at a distance 42 of the upper side 34 of the housing 12. Due to the distance 42, an upper quiet zone 44 (or bubble rising zone) is defined in an upper region of the housing. Analogous to this, the lower group 40 of plates has a lower edge 30 which is provided at a distance 46 of the lower side 36 of the housing 12. This creates a lower quiet zone 48 (or settlement zone) in a lower region of the housing. The upper quiet zone 44 is defined by the side wall of the housing 12, the upper wall 34 of the housing 12, and the upper ridges 30 of the upper plates 20. The lower quiet zone 48 is defined by the side wall of the housing 12, the lower wall 36 of the housing 12, and the lower ridges 30 of the lower plates 20.

At the downstream side of the removal device 10, a plate 50 (or endplate) is provided just in front of the discharge opening 26, wherein the plate 50 has a constricted opening 52.

In use, the constricted opening 52 acts like a Venturi opening and creates a build-up of pressure in the main flow channel 22 upstream of the constricted opening 52. The plate 50 defines an opening 51 at the upper side thereof and an opening 53 of the lower side thereof between the plate 50 and the housing 12. Between the plate 50 and the housing 1, a small space 68 is provided. The openings 51, 53 provide liquid communication between the space 68 and the quiet zones 44, 48.

At the upper side 34 of the removal device, an air removal valve 54 is provided which is known from the prior art.

At the lower side 36 of the removal device, a dirt discharge 56 is provided. Both at the upper side 34 as at the lower side 36, tapering surfaces are provided which cause the gas bubbles to arrive at the valve 54 respectively cause the dirt particles to arrive at the discharge 56.

Figure 2:
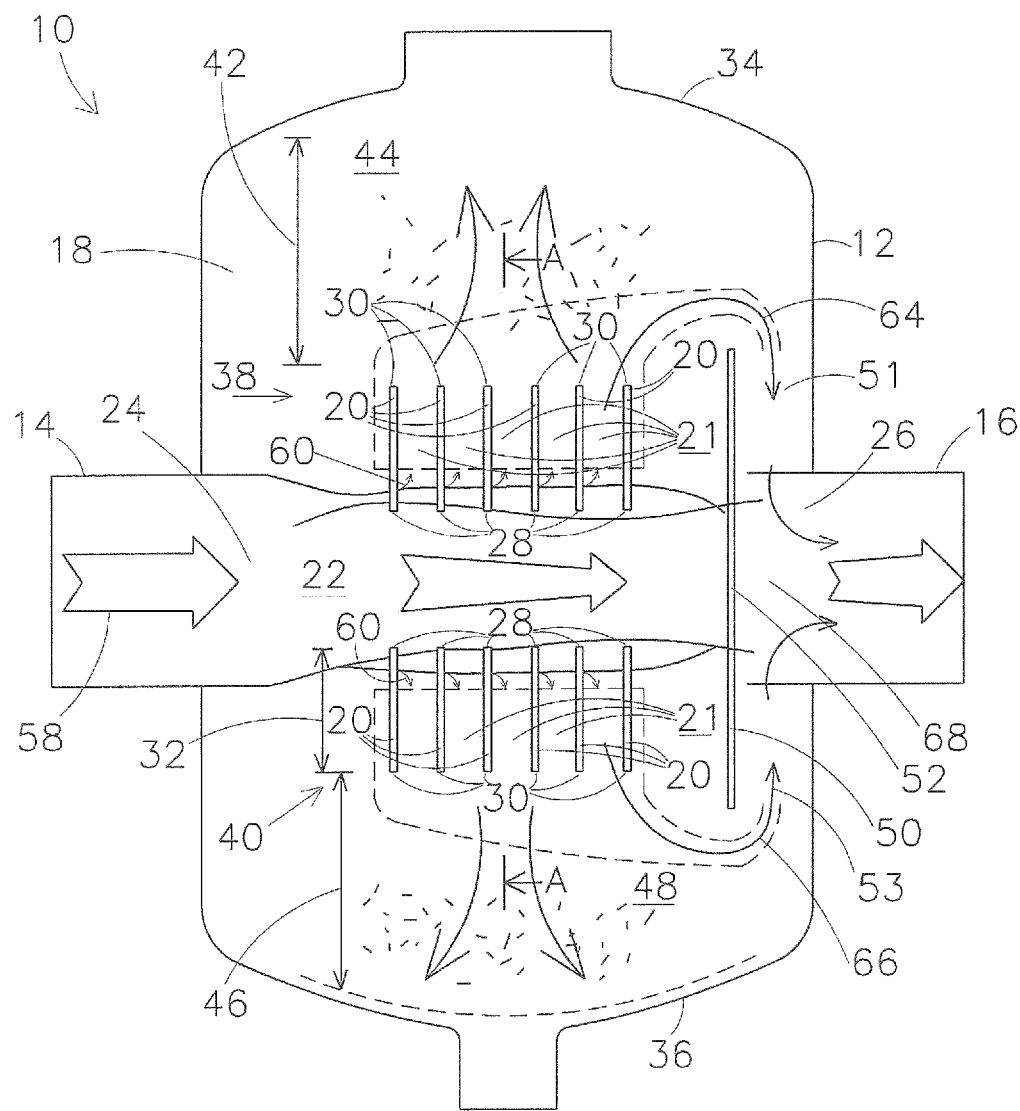
FIG. 2 shows a cross-sectional side view of the removal device according to the invention in use.

FIG. 2 shows the removal device 10 in use. A liquid flow 58 enters the space 18 via the entry 14. The liquid flow 58 flows through the main flow channel 22. The flow in the main flow channel is substantially laminar. Branch flows 60 are diverted from the main flow 58 in an upwards and downwards direction. The branch flows 60 flows through the interspaces 21, which act as branch flow channels 21. The branch flows are also substantially laminar. The branch flows 60 at the upper side arrive in the upper quiet zone 44. There, the upper branch flows 60 merge. The branch flows at the lower side arrive in the lower quiet zone 48. Here, the branch flows 60 merge. In use, the velocity in the main flow channel 22 is lower than in the entry 14 and the velocity of the branch flows between plates 20 is even lower.

The branch flows 60 have a substantially lower velocity of flow than the velocity of the main flow 58 at the entry 14, because the total surface area of the flow is much larger. Because of this, gas particles can rise and dirt particles can settle.

In the quiet zones 44, 48 the flows also have a much lower velocity than the main flow 58. This also stimulates the rising of gas particles and the settling of dirt particles.

From the quiet zones 44, 48 return flows 64, 66 are created which flow around the end plate 50 and merge with the main flow at a merge point 68.

Figure 3:
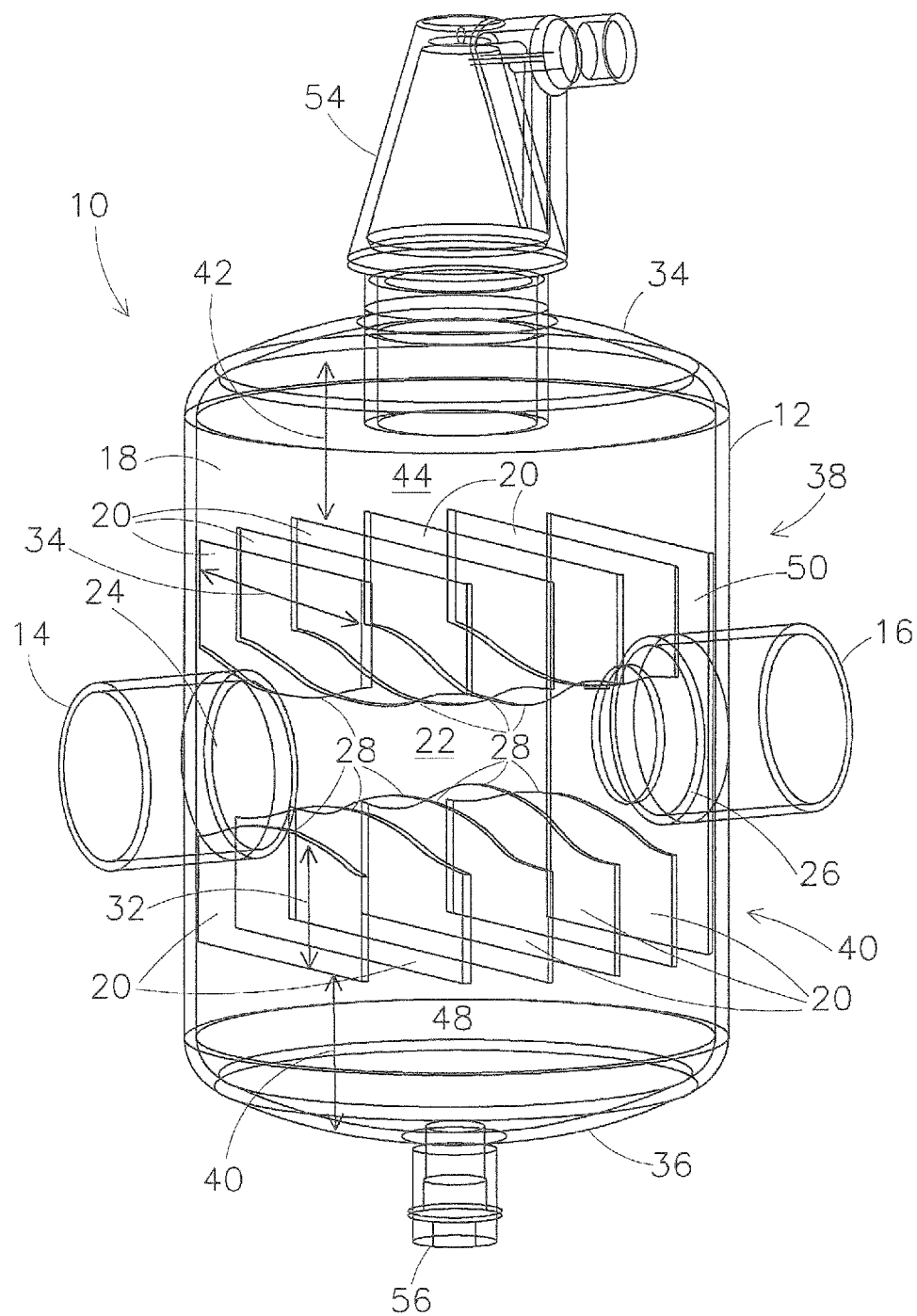
FIG. 3 shows a substantially same view as FIG. 1, but as a transparent line drawing.

FIG. 3 shows substantially the same figure as FIG. 1, but in a line drawing.

FIG. 5 shows an embodiment in which the plates 20 have a baffle form 29 which guide the flow into the branch channels 21. The baffle form result in less turbulence in the branch channels, because the branch flows are created in a more gradual way. The edges 28 can be provided with notches, fins, raffles or other discontinuities 61 in order to prevent large eddies.

A skilled person will readily understand that the invention can be varied in multiple ways without departing from the scope of protection as is defined by the claims.

The invention claimed is:

1. A removal device for removing gas bubbles or dirt particles from a liquid in a liquid conduit system, the removal device comprising:
    a housing having an entry and an exit and an inner space which is defined by the housing,
    wherein in the inner space a number of plates are provided which extend substantially transverse to a main flow direction,
    wherein the plates define a main ongoing flow channel which extends between the entry and the exit, and wherein the plates define branch flow channels which branch off from the main channel, and which end in at least one quiet zone, and
    wherein at least one plate defines a return flow channel for a return flow which merges with the main flow at a downstream merge point.

2. The removal device according to claim 1, wherein the removal device:
    a. comprises a quiet zone above the main flow for removing gas, but does not comprise a quiet zone below the main flow for the removal of dirt, or
    b. comprises a quiet zone below the main flow for the removal of dirt particles, but does not comprise a quiet zone above the main flow for the removal of gas bubbles, or
    c. comprises both a quiet zone above the main flow for the removal of gas and a quiet zone below the main flow for the removal of dirt particles.

3. The removal device according to claim 1 wherein the plates form a row of plates which are placed one after the other when seen in the direction of the flow.

4. The removal device according to claim 1, wherein in the plates define an upper row and a lower row.

5. The removal device according to one of the claim 1, wherein a constricted opening is provided in the main flow channel downstream of the entrances to the branch flow channels for creating a pressure build-up in the main flow channel upstream of the constricted opening, in order to urge a part of the main flow into the branch flow channels.

6. The removal device according to claim 5, wherein the constricted opening is provided in the plate which defines the return flow channel.

7. The removal device according to claim 5, wherein the constricted opening has a surface area which is smaller than the surface area of the entry opening and the discharge opening.

8. The removal device according to claim 5, wherein the constricted opening has a surface area which is smaller than the surface area of main flow channel.

9. The removal device according to claim 5, wherein the constricted opening has a substantially round form and wherein the main flow channel has a substantially square or rectangular form.

10. A method for manufacturing a dirt removal device according to claim 1, the method comprising providing a housing comprising an entry and an exit and providing plates in the housing.

11. A method for removing dirt or gas particles from a conduit system, the method comprising providing a removal device according to claim 1 in a conduit and guarding a liquid flow through the removal device.

* * * * *